(12) United States Patent
Kelesoglu et al.

(10) Patent No.: US 8,289,972 B2
(45) Date of Patent: Oct. 16, 2012

(54) GIGABIT PASSIVE OPTICAL NETWORK STRICT PRIORITY WEIGHTED ROUND ROBIN SCHEDULING MECHANISM

(75) Inventors: Mehmet Zeki Kelesoglu, Raleigh, NC (US); David Gregory Eckard, Knightdale, NC (US)

(73) Assignee: Alcatel Lucent, Paris (FR)

( * ) Notice: Subject to any disclaimer, the term of this patent is extended or adjusted under 35 U.S.C. 154(b) by 1216 days.

(21) Appl. No.: 11/269,934

(22) Filed: Nov. 9, 2005

(65) Prior Publication Data

US 2006/0098680 A1  May 11, 2006

Related U.S. Application Data

(60) Provisional application No. 60/626,652, filed on Nov. 10, 2004.

(51) Int. Cl.
*H04L 12/28* (2006.01)
(52) U.S. Cl. .................................. 370/395.41
(58) Field of Classification Search .................. 370/229, 370/230, 235, 392, 395.21, 448, 468, 476, 370/240, 241; 709/223, 240, 241
See application file for complete search history.

(56) References Cited

U.S. PATENT DOCUMENTS

| | | | |
|---|---|---|---|
| 6,556,572 B1 * | 4/2003 | Ishida | 370/395.41 |
| 6,990,113 B1 | 1/2006 | Wang | |
| 2002/0048280 A1 * | 4/2002 | Lee et al. | 370/468 |
| 2003/0128707 A1 * | 7/2003 | Kalkunte et al. | 370/395.41 |
| 2003/0202517 A1 * | 10/2003 | Kobayakawa et al. | 370/395.4 |
| 2004/0004971 A1 * | 1/2004 | Wang | 370/412 |
| 2004/0095885 A1 * | 5/2004 | Yang | 370/235.1 |
| 2004/0165596 A1 * | 8/2004 | Garcia et al. | 370/395.21 |
| 2004/0174881 A1 * | 9/2004 | Okubo | 370/395.4 |
| 2004/0258070 A1 * | 12/2004 | Arima | 370/395.4 |
| 2005/0271084 A1 * | 12/2005 | Bruckman et al. | 370/468 |

FOREIGN PATENT DOCUMENTS

| | | |
|---|---|---|
| EP | 0 977 405 B1 | 3/2005 |
| JP | 2002118585 A | 4/2002 |
| WO | 02/09358 A2 | 1/2002 |
| WO | 02/101985 A2 | 12/2002 |

* cited by examiner

*Primary Examiner* — Michael Thier
*Assistant Examiner* — Awet Haile
(74) *Attorney, Agent, or Firm* — RG & Associates

(57) ABSTRACT

A system, method, and computer readable medium for strict priority weighted round robin scheduling includes selecting a set of bandwidth allocation table filled entries having a common destination address, each filled entry associated with a received data packet and determining a scheduling weight for each bandwidth allocation table entry in the selected set, the scheduling weight determined first by a priority and then by an assigned weight.

10 Claims, 2 Drawing Sheets

| INDEX | ALLOCID | PRIORITY | INITIAL WEIGHT | INCREMENT | BLOCK COUNT |
|---|---|---|---|---|---|
| 0 | 0 | 0 | 0 | 1 | 0 |
| 1 | 0 | 0 | 0 | 1 | 0 |
| 2 | 1 | 0 | 0 | 0 | 0 |
| 3 | 1 | 1 | 0 | 0 | 0 |
| m | 0 | 1 | 0 | 0 | 0 |
FIG. 3
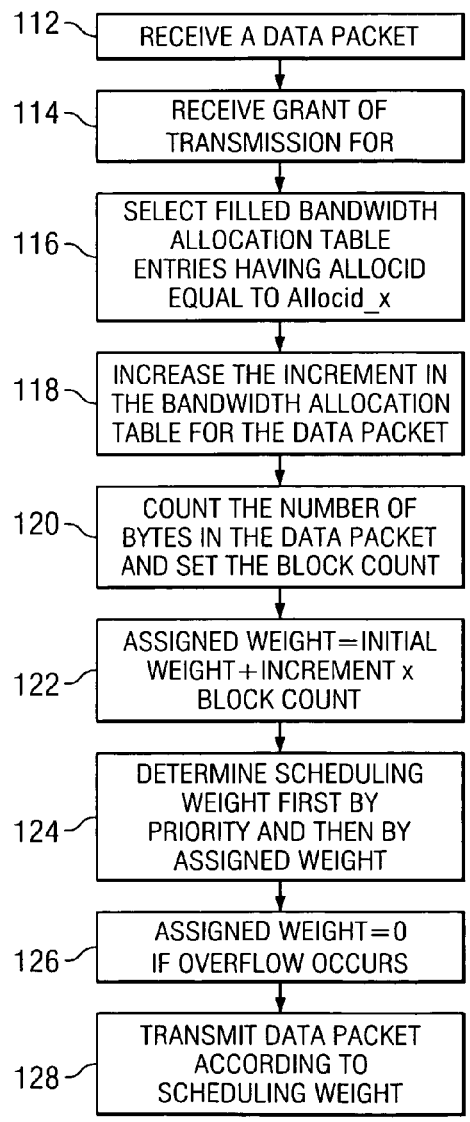
FIG. 4
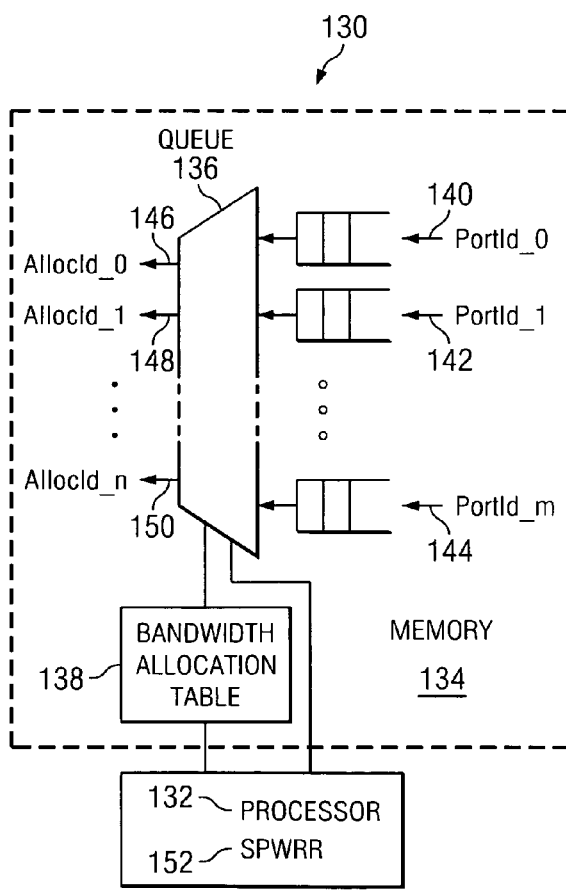
FIG. 5

GIGABIT PASSIVE OPTICAL NETWORK STRICT PRIORITY WEIGHTED ROUND ROBIN SCHEDULING MECHANISM

CROSS REFERENCE TO RELATED APPLICATIONS

The present patent application is related to and claims the benefit of provisional patent application No. 60/626,652, filed on Nov. 10, 2004, entitled 7342 FTTU GPON ONT SWRR SCHEDULER, the entire contents of which is enclosed by reference herein.

BACKGROUND OF THE INVENTION

Field of the Invention

The present invention is generally related to a single level scheduling mechanism for signaling servers and, more specifically to a gigabit passive optical network strict priority weighted round robin scheduling mechanism.

Currently, data packet networks require scheduling to satisfy quality of service requirements. Scheduling mechanisms to accommodate both priority and weighting currently require multi-level scheduling to separately consider each level of priority and weight. The scheduling difficulty lies in the varying percentages of specified priorities and weights. Current implementation in hardware requires a multi-level scheduling mechanism with each level being either strict priority or weighted.

Therefore, what is needed is a flexible single level scheduler. More specifically, what is needed is a strict priority weighted round robin scheduler implemented in software that can provide a single level scheduling mechanism that schedules according to priority, weight or a combination of priority and weight. The multiple output or logical division of the scheduler based on same destination (which is identified by AllocId) is the main flexibility provided by this invention.

SUMMARY OF THE INVENTION

Traffic control in gigabit passive optical networks requires the use of schedulers to meet quality of service requirements. A data packet can have a logical output port (AllocId), an associated priority, a weight or both priority and weight. Currently determining an appropriate scheduling weight in hardware requires multi-level scheduling to separately account for priority and weight. The present invention provides the mechanism to allow combinations of logical output port, priority and weight to be assessed in the single level scheduler.

Data packets to be scheduled and routed enter a queue for traffic control. Information associated with the data packet and needed for traffic control is stored in a Bandwidth Allocation Table (BAT). The single level scheduler of the present invention utilizes information from the bandwidth allocation table to make scheduling decisions. The bandwidth allocation table data associated with the data packet includes an index to identify the data packet, a destination address of where the data packet is routed termed an AllocId, the priority, an initial weight, an increment weight and a block count.

The index of the bandwidth allocation table is the value to identify the data packet. The index can be associated with an incoming identifier termed a PortId.

The destination address of the data packet in the bandwidth allocation table is the value used to identify data packet routing. The destination address is termed the AllocId. The same destination address can be used for more than one data packet. If more than one data packet is routed to the same destination address scheduling is needed to control the traffic.

The priority of the data packet in the bandwidth allocation table is the value between 0 which is the highest priority and 7 which is the lowest priority. If more than one data packet has the same destination address each data packet routed for that destination address should be assigned to different priority levels to allow scheduling.

The initial weight of the data packet in the bandwidth allocation table is needed if more than one data packet has the same address and the same priority level. In this case each data packet should be assigned the weight to allow scheduling.

The increment of the data packet in the bandwidth allocation table is increased after the data packet end of frame has been received by the queue.

The block count of the data packet in the bandwidth allocation table accumulates the number of bytes that have been received in the queue when a data packet end of frame has been received by the queue.

The assigned weight of the data packet calculated by the strict priority weighed round robin scheduler is the initial weight of the data packet plus the increment multiplied by the block count.

The specified sequence of transmission of the data packets is referred to as a queue order. Data packets being sent to the common destination address are assigned queue order based first on strict priority and then by assigned weight for packets having the same priority.

A transmission grant is the permission to transmit the data packet from the queue to the destination address AllocID.

In one embodiment, a method for strict priority weighted round robin scheduling including selecting a set of bandwidth allocation table filled entries having a common destination address, each filled entry is associated with a received data packet and determining a scheduling weight for each bandwidth allocation table entry in the selected set, the scheduling weight being determined first by a priority and then by an assigned weight.

In one embodiment, a method for strict priority weighted round robin scheduling including receiving a data packet, the data packet including a destination address, a priority and an initial weight, constructing the bandwidth allocation table entry associated to the received data packet, the bandwidth allocation table entry including the destination address, the priority and the initial weight, increasing an increment in the bandwidth allocation table by a pre-determined value upon reception of the associated data packet, counting a number of bytes in the received data packet, setting a block count in the bandwidth allocation table to the counted number of bytes in the associated received data packet, adding the increment to the bandwidth allocation table entry of the associated received data packet, adding the block count to the bandwidth allocation table entry of the associated received data packet, selecting a set of bandwidth allocation table filled entries having a common destination address, each filled entry being associated with the received data packet, calculating an assigned weight of the received data packet by multiplying the increment and the block count and adding the product to the initial weight in the bandwidth allocation table of the associated received data packet, wherein the calculation of the assigned weight occurs after the end of frame of the associated received data packet, determining a scheduling weight for each bandwidth allocation table entry in the selected set, the scheduling weight being determined first by the priority and then by an assigned weight, resetting the assigned weight for the selected entries having identical destination addresses and common priority to zero if overflow occurs, and accepting a grant for transmission of the data packet and transmitting the data packet having the minimum scheduling weight.

In another embodiment, a computer readable medium comprising instructions for the strict priority weighted round robin scheduling mechanism includes increasing an increment in a bandwidth allocation table by a pre-determined value upon reception of a data packet, counting a number of bytes in the received data packet, setting a block count in the bandwidth allocation table to the counted number of bytes of the associated received data packet, calculating an assigned weight of the received data packet by multiplying the increment and the block count and adding the product to an initial weight in the bandwidth allocation table of the associated received data packet and determining a scheduling weight for each bandwidth allocation table entry in the selected set, the scheduling weight being determined first by a priority and then by the assigned weight, selecting a set of bandwidth allocation table filled entries having a common destination address, each filled entry being associated with the received data packet, wherein the calculation of the assigned weight occurs after reception of the end of frame of the associated received data packet, resetting the assigned weight for the selected entries having identical destination addresses and common priority to zero if overflow occurs, accepting a grant for transmission of the data packet and transmitting the data packet having the minimum scheduling weight.

In a further embodiment, the strict priority weighted round robin scheduling mechanism having a computer readable medium including instructions for constructing an entry in a bandwidth allocation table associated with a received data packet, the entry having an index, a destination address, a priority, an initial weight, an increment and a block count, assigning the index for the bandwidth allocation table entry, determining the priority of the bandwidth allocation table entry, allocating the initial weight of the bandwidth allocation table entry, increasing the increment of the bandwidth allocation table entry by a pre-determined value upon reception of the associated data packet and setting the block count of the bandwidth allocation table entry to the number of bytes of the associated received data packet.

In yet a further embodiment, a system adapted to provide strict priority weighted round robin scheduling including a memory having a queue in which is received a data packet from an incoming port identifier, the memory having a bandwidth allocation table, the bandwidth allocation table having entries containing an index, a destination address, a priority, an initial weight, an increment and a block count, the entry being associated with the received data packet and a processor such as a computer processor, communicably coupled to the queue and the bandwidth allocation table in the memory, wherein the processor selects a set of bandwidth allocation table entries having common destination addresses and priorities, wherein the processor increases an increment of the bandwidth allocation table by a pre-determined value upon reception of the data packet in the queue, wherein the processor counts the number of bytes in the received data packet, wherein the processor sets a block count of the bandwidth allocation table to the number of counted bytes in the received data packet, wherein the processor calculates an assigned weight of the received data packet by multiplying the increment and the block count and adding the product to the initial weight of the received data packet, wherein the processor determines a scheduling weight for each bandwidth allocation table entry in the selected set, the scheduling weight being determined first by a priority and then by the assigned weight, wherein the calculation of the assigned weight by the processor occurs after reception of an end of frame of the associated received data packet in the queue, wherein the processor resets the assigned weight for the selected entries having identical destination addresses and common priority to zero if overflow occurs, wherein the processor accepts a grant for transmission of the data packet from the queue in memory and wherein the processor transmits the data packet having the minimum scheduling weight from the queue in memory.

BRIEF DESCRIPTION OF THE DRAWINGS

FIG. 3 depicts a bandwidth allocation table in accordance with a preferred embodiment of the present invention;

FIG. 4 depicts a software flow block in accordance with a preferred embodiment of the present invention; and FIG. 5 depicts a third strict priority weighted round robin scheduling system in accordance with a preferred embodiment of the present invention.

DETAILED DESCRIPTION OF THE INVENTION

Figure 1:
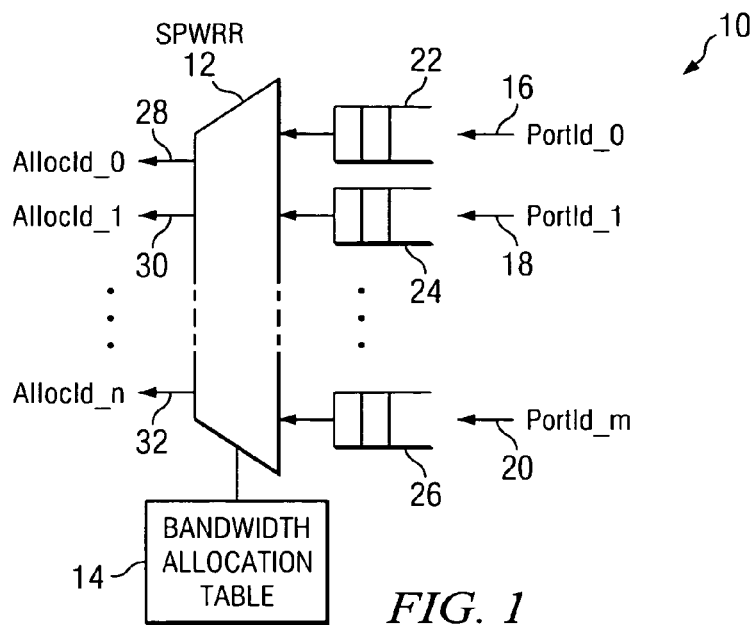
FIG. 1 depicts a first strict priority weighted round robin scheduling system in accordance with a preferred embodiment of the present invention.

Referring now to FIG. 1, a method for Strict Priority Weighted Round Robin (SPWRR) scheduling is performed via a system 10 of the present invention that comprises a number of blocks or modules described further below. These blocks or modules are software, hardware, firmware, and/or the combination of software, hardware, and/or firmware. A set of data packets 22, 24 and 26 to be scheduled and routed enter a queue or SPWRR scheduler 12 for traffic control. Information associated with the data packet and needed for traffic control is stored in a Bandwidth Allocation Table (BAT) 14. The incoming data packets arrive at the queue from an incoming port identifier termed a PortId 16, 18 and 20. These data packets have a priority. The SPWRR scheduler 12 interfaces with the BAT to determine a scheduling weight of the data packet. Once the scheduling weight is calculated the data packet is routed in turn to a destination address termed an AllocID 28, 30 and 32.

Figure 2:
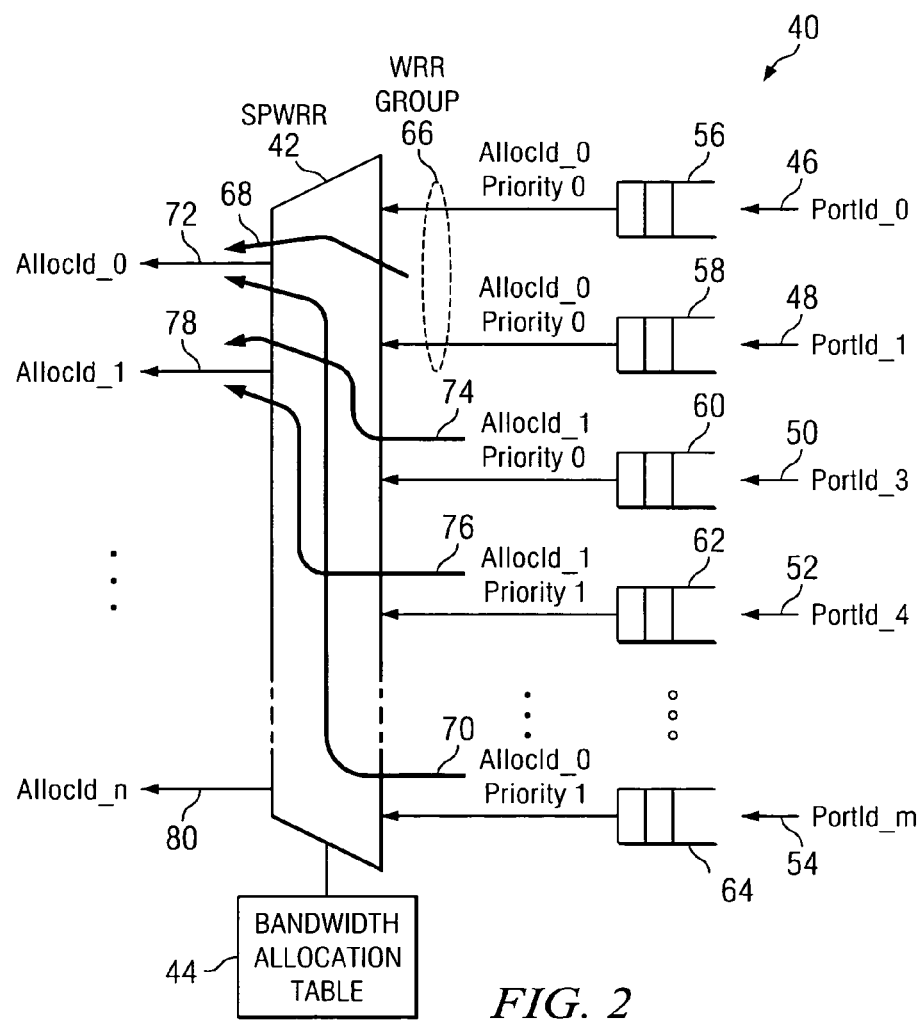
FIG. 2 depicts a second strict priority weighted round robin scheduling system in accordance with a preferred embodiment of the present invention.

Referring now to FIG. 2, a more detailed system 40 for Strict Priority Weighted Round Robin (SPWRR) scheduling is depicted and comprises a number of blocks or modules. These blocks or modules are software, hardware, firmware, and/or the combination of software, hardware, and/or firmware. The present invention increases an increment in the bandwidth allocation table 44 by the pre-determined value upon reception at the queue or SPWRR scheduler 42 of an end of frame for the associated data packet 56, 58, 60, 62 and 64. A block count is made of the number of bytes in the data packet and this value is added to the BAT for the associated data packet. The incoming data packet has an initial weight. An assigned weight of the associated data packet is calculated by adding the product of the increment and the block count to the initial weight.

The SPWRR scheduler 42 selects a set of non-empty bandwidth allocation entries having common destination addresses first by priority and then by the assigned weight. The bandwidth allocation entries having a common destination address AllocID and common priority are referred to as a Weighted Round Robin (WRR) group 66. If an overflow condition occurs then the assigned weight of the non-empty bandwidth allocation entries having the common destination address, WRR group, are set to zero.

The strict priority weighted round robin mechanism can determine a queue order based on both priority and applied weight. The queue order is chosen based first on priority, if more than one entry has the same priority level, the queue order is then chosen based on the assigned weight. After the reception of a transmission grant, table entries assigned to the same destination address (AllocId) 72, 78 and 80 are scanned and the queue order is chosen based on the priority and the assigned weight. The priority and assigned weight allow calculation of the scheduling weight. The lowest scheduling weigh value within the same destination address group has the highest priority for the next scheduling opportunity. As data packets are received at the incoming port identifier (PortId) 46, 48, 50, 52 and 54, the number of bytes are counted and summarized as the block count. Once the data packet received at the incoming identifier has sent the end of frame the assigned weight is updated by adding the increment multiplied by the block count to the initial weight. If the assigned weight causes the overflow, then the assigned weight of all entries assigned to same priority for the same destination address are reset to zero. If the entry is defined as strict priority, then the increment is set to zero. The data packets are routed 68, 70, 74 and 76 to the appropriate destination address, AllocId.

A scheduling algorithm of the present invention appears below. This algorithm is preferably embodied in a computer readable medium or software but may also be embodied in firmware and is utilized via hardware.

The algorithm includes the following steps:

1. Wait for the transmission grant for AllocId_x and go to step 2;
2. Select the bandwidth allocation table entry;
   a. which is filled,
   b. whose AllocId is equal to AllocId_x,
   c. which has minimum priority (among other entries matching a and b condition),
3. If an entry is found update the apparent weight;
   a. update apparent weight=initial weight+increment,
   b. if overflow occurs reset weight of all entries in the selected weighted round robin group (entries having the same Allocid_x and same priority).
   c. transmit the data packet from the queue
4. Goto Step 1

Referring now to FIG. 3, the blocks or modules are software, hardware, firmware, and/or the combination of software, hardware, and/or firmware. The bandwidth allocation table 90 contains information necessary to determine queue order and routing of the data packets. An index 92 is the value to identify each data packet in the queue. Each queue can be associated to the incoming port identifier.

Each entry in the BAT is associated to the destination address AllocId 94. The same destination address can be used by more than one entry. Whenever more than one entry is routed toward the same destination address either priority 96 or assigned weight or both should be utilized to determine the bandwidth sharing between data packets. If there is no associated destination address AllocID 94 then a default value of 255 is used in the entry.

When more than one data packet is routed towards same destination address, the scheduling mechanism should be specified. If the priority based mechanism is utilized, then each entry should be assigned to different priority levels. If more than one entry is required to have same priority then the assigned weigh for each entry should be specified in the same priority level. The highest priority level is specified as 0 (zero), the lowest priority level is 7, while the default priority is set to 0.

When more than one data packet is routed towards same destination address with same priority level, the entries of this group are referred to as the weighted round robin group and the strict priority weighted round robin scheduling mechanism is used to determine scheduling. The default initial weight 98 value is set to 0 by hardware. This value is preferably not modified as it is used by hardware to represent the weight value. The assigned weight is relative to the assigned weights of the other data packets having the same destination address and same priority level.

The increment 100 in the bandwidth allocation table is increased by the pre-determined value upon reception at the queue of the end of frame for the associated data packet. The block count 102 is used to accumulate the number of blocks that have been received by the queue. The block unit indicates the particular number of bytes that have been received by the queue. When the end of frame is received by the queue, the block count and the increment are multiplied and the result is added to the initial weight to determine the assigned weight. This calculation guarantees that the queue is able to transmit the entire frame since the assigned weight is not updated until the end of frame. This calculation reduces the amount of fragmentation support needed at the optical line termination and meets the bandwidth weight requirements of the queue. Since the increment and the block count are multiplied together, the size of the routed data packets should be sized accordingly to reduce the amount of overflow.

The strict priority weighted round robin scheduling mechanism of the present invention includes a computer readable medium including instructions for constructing an entry in the bandwidth allocation table 90 associated with the received data packet. The entry includes the index 92, the destination address (AllocId) 94, the priority 96, the initial weight 98, the increment 100 and the block count 102. The strict priority weighted round robin scheduling mechanism comprises instructions for assigning the index for the bandwidth allocation table entry, determining the priority of the bandwidth allocation table entry, allocating the initial weight of the bandwidth allocation table entry, increasing the increment of the bandwidth allocation table entry by a pre-determined value upon reception of the associated data packet and setting the block count of the bandwidth allocation table entry to the number of bytes of the associated received data packet.

Referring now to FIG. 4, a method 110 for strict priority weighted round robin scheduling is depicted. The strict priority weighted round robin scheduler receives 112 the data packet which includes a destination address, a priority and an initial weight. The BAT is constructed with the entry including the destination address, the priority and the initial weight. The transmission grant of the data packet is accepted 114 and the set of BAT is selected 116 from filled entries having the common destination address. The increment in the BAT is increased 118 by the pre-determined value upon reception of the associated data packet, and the number of bytes in the received data packet is counted 120. The block count is set in the BAT to the counted number of bytes in the associated received data packet, and the increment is added to the BAT entry of the associated received data packet. The block count is added to the bandwidth allocation table entry of the associated received data packet.

The method proceeds when the assigned weight of the received data packet is calculated 122 by multiplying the increment and the block count and adding the product to the initial weight in the bandwidth allocation table of the associated received data packet. The calculation of the assigned weight occurs after the end of frame of the associated data packet is received in the queue. The scheduling weight is determined for each bandwidth allocation table entry in the selected set. The scheduling weight is determined 124 first by the priority and then by the assigned weight. The assigned weight is reset 126 for the selected entries having identical destination addresses and common priority to zero if overflow occurs. The transmission grant 114 of the data packet is accepted and the data packet having the minimum scheduling weight is transmitted 128.

Referring now to FIG. 5, a SPWRR scheduling system 130 of the present invention comprises a number of blocks or modules that are software, hardware, firmware, and/or the combination of software, hardware, and/or firmware.

A memory 134 contains the set of data packets to be scheduled and routed which enter the queue 136 for traffic control. The memory includes the queue which receives the data packet from the incoming port identifier, and further includes the BAT 138 which includes information associated with the data packet and needed for traffic control is stored in the BAT. The incoming data packets arrive at the queue from an incoming port identifier termed the PortId 140, 142 and 144. The data packets have the priority. The SPWRR scheduler 152 interfaces with the BAT to determine the scheduling weight of the data packet. Once the scheduling weight is calculated, the data packet is routed to the destination address AllocID 146, 148 and 150.

A processor 132 is communicatively coupled to the BAT and the queue. The processor executes the instructions for SPWRR scheduling 152 to route and schedule the traffic flow of the data packets within the network.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the management processor, site server or network processor modules. Also, these capabilities may be performed in the current manner or in a distributed manner and on, or via, any device able to provide and/or receive scheduling information. Further, although depicted in a particular manner, various modules or blocks may be repositioned without departing from the scope of the current invention. For example, the functionality performed by the BAT and the queue can be self-contained. Still further, although depicted in a particular manner, a greater or lesser number of queues, schedulers, BATs, incoming port identifiers, and destination addresses can be utilized with the present invention. Further, a lesser or greater number of data packets may be utilized with the present invention and such data packets may include known complementary information in order to accomplish the present invention, to provide additional known features to the present invention, and/or to make the present invention more efficient.

What is claimed is:

1. A method for strict priority weighted round robin scheduling, comprising:
    selecting, via a processor, a set of bandwidth allocation table filled entries stored in a memory having a common destination address, each filled entry associated with a received data packet;
    increasing an increment in the bandwidth allocation table by a pre-determined value upon reception of the received data packet;
    setting a block count in a bandwidth allocation table entry to a counted number of bytes associated with the received data packet; and
    determining, via the processor, a scheduling weight for each bandwidth allocation table entry in the selected set, the scheduling weight determined first by a priority and then by an assigned weight, wherein the assigned weight is calculated after receiving an end of frame for the received data packet by multiplying the increment and the block count, and adding the product to an initial weight of the received data packet stored in the bandwidth allocation table entry associated with the received data packet.

2. The method of claim 1 comprising counting a number of bytes in the received data packet.

3. The method of claim 1 comprising adding the increment to the bandwidth allocation table entry associated with the received data packet.

4. The method of claim 3 comprising adding the block count to the bandwidth allocation table entry associated with the received data packet.

5. The method of claim 1 comprising resetting the assigned weight of the selected entries having identical destination addresses and common priority to zero if overflow occurs.

6. The method of claim 1 comprising receiving the data packet, the data packet including the destination address, the priority and an initial weight.

7. The method of claim 1 comprising constructing the bandwidth allocation table entry corresponding to the received data packet, the bandwidth allocation table entry including the destination address, the priority and an initial weight.

8. The method of claim 1 comprising accepting a grant for transmission of the data packet.

9. The method of claim 1 comprising transmitting the data packet having a minimum scheduling weight, which is the minimum assigned weight for entries having a common destination address and common priority.

10. A non-transitory computer readable storage medium comprising instructions that when executed cause a processor to perform:
    constructing an entry in a bandwidth allocation table associated with a received data packet, the entry having an index, a destination address, a priority, an initial weight, an increment and a block count;
    assigning the index for the bandwidth allocation table entry;
    determining the priority of the bandwidth allocation table entry;
    allocating the initial weight of the bandwidth allocation table entry;
    increasing the increment of the bandwidth allocation table entry by a pre-determined value upon reception of the received data packet;
    setting the block count of the bandwidth allocation table entry to a counted number of bytes associated with the received data packet; and
    determining a scheduling weight for each bandwidth allocation table entry in a selected set, the scheduling weight determined first by a priority and then by an assigned weight, wherein the assigned weight is calculated after receiving an end of frame for the received data packet by multiplying the increment and the block count, and adding the product to an initial weight of the received data packet stored in the bandwidth allocation table entry associated with the received data packet.

* * * * *